UNITED STATES PATENT OFFICE.

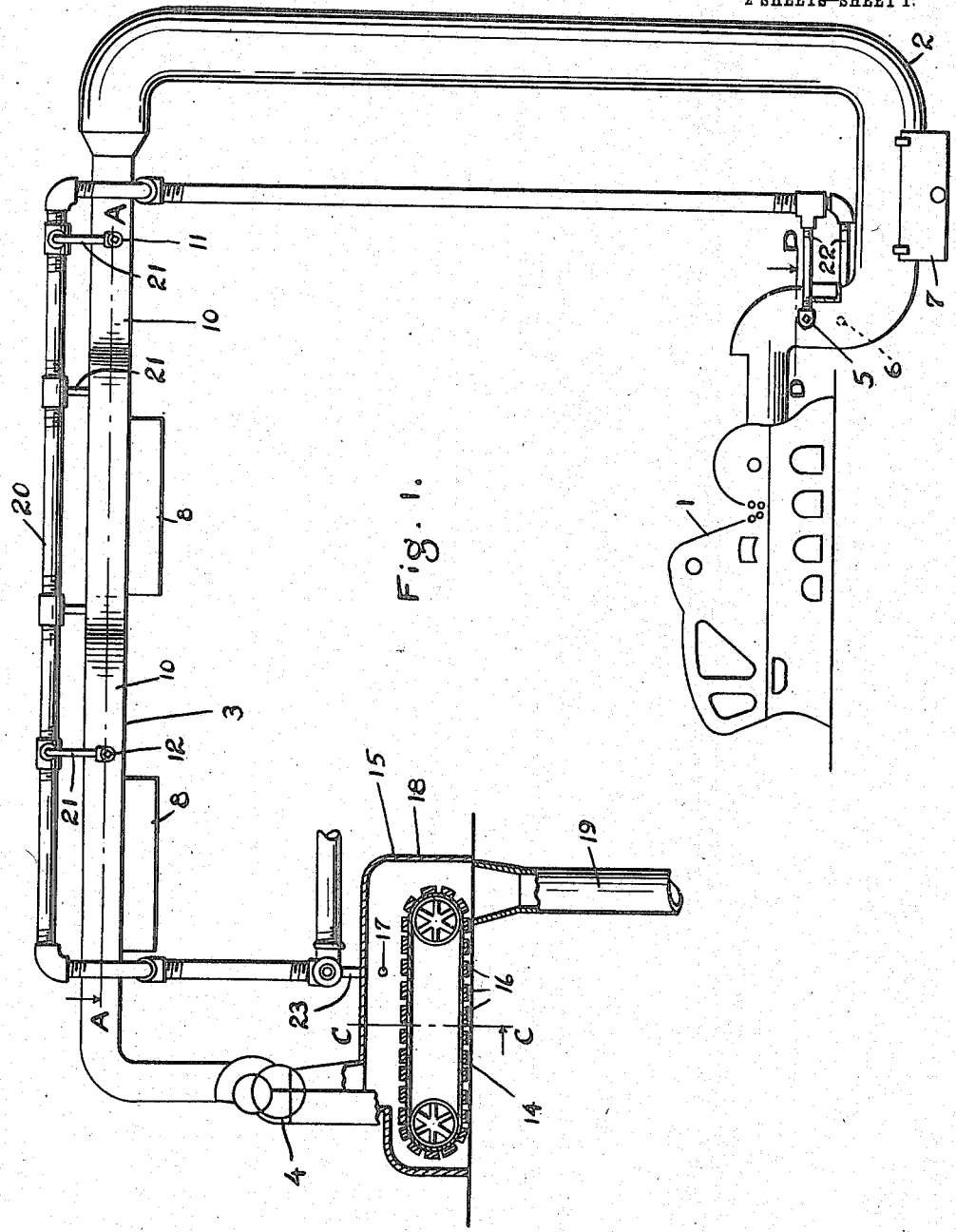

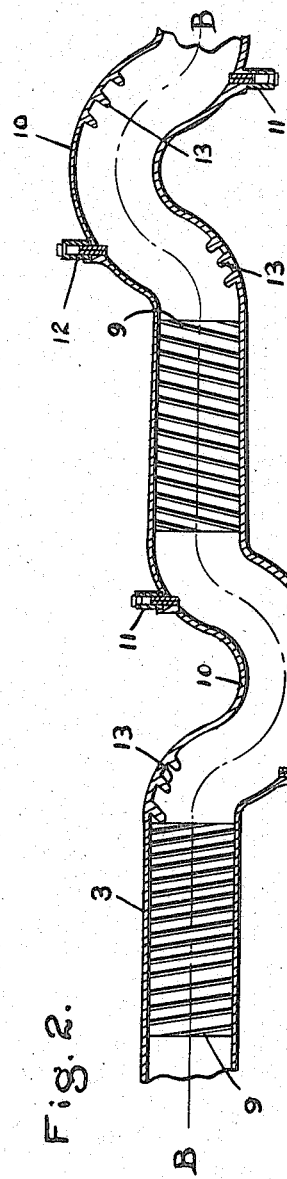
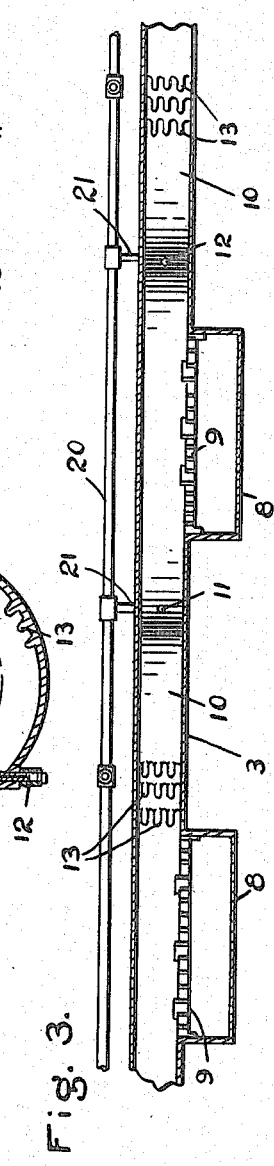
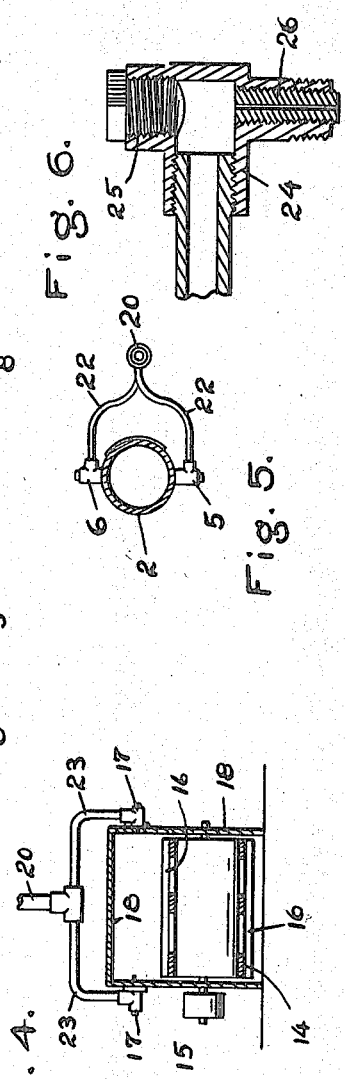

JOHN F. REARDON, OF NORTH GROSVENOR DALE, CONNECTICUT.

APPARATUS FOR BLOOMING AND CLEANSING COTTON AND THE LIKE.

1,129,902.     Specification of Letters Patent.     Patented Mar. 2, 1915.

Original application filed May 29, 1911, Serial No. 630,140. Divided and this application filed July 24, 1913. Serial No. 780,852.

*To all whom it may concern:*

Be it known that I, JOHN F. REARDON, a citizen of the United States, residing at North Grosvenor Dale, in the county of Windham and State of Connecticut, formerly of Millville, Cumberland county, New Jersey, have invented certain Improvements in Apparatus for Blooming and Cleansing Cotton and the like, of which the following is a specification, this application being a division of my prior one filed May 29, 1911, Serial No. 630,140, for which Patent No. 1,111,761 was issued September 29, 1914.

The objects of the invention are to remove the seed, dirt, leaf, and other foreign matter from the cotton without breaking or damaging the fiber; to effect such removal without resorting to mechanical beating of the cotton; to utilize for this purpose jets of air under pressure, either alone or in connection with special impact surfaces to receive the cotton; to subject the cotton to the action of such jets of air while it is in motion, either directly from said currents or by the use of additional means; to provide for receiving the dirt and other foreign matter as it is removed from the cotton, and to obtain other advantages and results as may be brought out in the following description.

Referring to the accompanying drawings, in which like numerals of reference indicate the same parts throughout the several figures, Figure 1 is a diagrammatic side elevation partly in section, of one form of apparatus adapted for carrying out my improvements; Fig. 2 is a horizontal section of the trunk taken on line A—A of Fig. 1; Fig. 3 is a vertical section of the same taken on line B—B of Fig. 2; Fig. 4 is a vertical transverse section of the apron-cleanser which is shown in section in Fig. 1, said Fig. 4 being taken on line C—C of Fig. 1; Fig. 5 is a transverse section taken on line D—D of Fig. 1, and Fig. 6 is a detail longitudinal section of one of the nozzles for supplying jets of compressed air.

For purposes of illustration I have shown my improvements applied to means for opening and loosening the matted cotton as taken from the bale, although I desire it to be clearly understood that I do not limit myself to the treatment of cotton at this stage alone, but can apply my improvements to cleansing cotton at any stage of its treatment where it may be found advantageous to do so.

In said drawings, 1 indicates a bale-opener of any ordinary and well-known construction, and from which the cotton is adapted to pass into a tubular goose-neck 2, and through a trunk 3 to a condenser 4, which condenser is of any ordinary and well-known construction, although the goose-neck 2 and trunk 3 embody features of my invention next to be described.

It will be understood that the cotton is drawn through the goose-neck 2 and trunk 3 by suction applied through the condenser 4 in any ordinary and well-known manner. Upon entering the goose-neck 2, the cotton is subjected to a jet of air under pressure, which is preferably directed transversely of the tubular passage by means of a nozzle 5. A little farther on is a second nozzle 6 which I have shown opening into the tubular passage of the goose-neck at the opposite side from the first nozzle 5. In some such manner, therefore, the cotton is subjected to one or more jets of air under pressure, and it will be understood that any desired number of jets may be employed, and that they may act successively upon the cotton as it passes along by suction or a plurality of jets may act simultaneously upon the cotton. The jets may engage the cotton in any direction or directions desired, and the pressure of said jets may be varied at will and to suit different conditions. The effect of said jets of air upon the cotton is to loosen and diffuse the same and to remove from it seed, dirt, pieces of leaf and other foreign matter, without breaking or injuring the fiber of the cotton. This is the main feature of my invention, to clean the cotton without injuring or breaking its fiber. The cotton passes on through the goose-neck 2, the dirt which is removed escaping at the bottom through a grate 7 of ordinary and well-known construction, and so comes to the trunk 3. Said trunk 3 is shown as rectangular in cross-section for its main portion providing a passage for the cotton and being somewhat wider than high. At intervals in said trunk are downward extensions or depressed receptacles 8 for dirt and foreign matter, across the top of which are grids forming portions of the floor of the cotton passage and through which the dirt may fall. The bars of said grids 9 are preferably inclined to the length of the trunk or direction of movement of the cotton, and I have shown such inclination as 77½ degrees, although it obviously can be varied. An occasional bar in each grid is raised slightly above the level of the next adjacent ones, as for example, every sixteenth bar may be raised a quarter of an inch. I do not confine myself to these figures, as more or less bars may be raised, to greater or less height. The purpose is to present a slight obstruction to the cotton in passing, so as to aid in removing the dirt and other foreign matter. The inclination of the bars of the grids not only presents more space through which the dirt can fall, but also renders the cotton less likely to catch thereon and become obstructed.

In advance of each grid, or just before the cotton reaches it, the walls of the trunk are provided with nozzles through which jets of air under pressure are introduced to engage the cotton. These jets are similar to the jets already described as introduced into the goose-neck, and may be of any number, or pressure, introduced in any direction, so as to act successively or collectively, or may be otherwise varied. For greater definiteness, however, I have shown the particular arrangement next to be described, although I do not limit myself thereto. A U shaped lateral bend is formed in the trunk, as at 10, and a nozzle 11 directs a jet of air longitudinally of the first arm of said bend, while a second nozzle 12 just beyond the curve of the bend introduces a jet of air longitudinally of the second arm of said bend. The cotton as it passes around said bend is thus thoroughly and effectively engaged by the said jets of air under pressure, and at the same time its onward progress is not impeded or retarded. The said nozzles 11 and 12 are shown leading through the upright sides of the trunk, or its bend 10, and directly opposite each of them the side wall of the trunk or its bend is provided with a group of projections or protuberances 13 which incline in the direction of movement of the cotton, so that it may impinge thereon without danger of catching or being obstructed from onward passage. These pins 13 may be of any suitable size and length, and arranged at any desired distance apart, but I preferably arrange them about an inch and a quarter apart at an angle of forty-five degrees and make them about an inch and a quarter long of conical shape with a base a half inch in diameter. The cotton passes onto a second set of pins 13 as it leaves the bend 10, and then passes over one of the grids 9. The successive bends 10 of the trunk alternate in direction of projection, one being to one side of the trunk and the next to the other side, preferably, and the bars of the grid next succeeding any bend incline from the side of the trunk toward which said last preceding bend projects forwardly toward the opposite side, as shown in the drawings.

Obviously any number of grids or grid sections 9 may be employed as desired, and may be of any length or any distance apart. The air jets may also be variously located with respect to said grids or grid sections, as I have already indicated, so long as they carry out my invention.

From the trunk 3 the cotton passes into the condenser 4 which is of any common and well-known construction, and therefore only diagrammatically shown in the drawings. It will be recognized by those skilled in the art that the suction which draws the cotton through the trunk 3 is applied through the condenser, and in the condenser such motion of the cotton is terminated. From the said condenser 4 the cotton drops by gravity onto the conveyer or apron 14 of the apron-cleanser 15. The passage of the cotton through the trunk 3 has been extremely rapid, and the apron-cleanser is employed as a means for subjecting the cotton to the action of jets of air under pressure while said cotton is moving more slowly. The conveyer or apron 14 is made up of transverse slats or strips 16 spaced upon flexible bands, so that dirt and other foreign matter removed from the cotton can fall between the slats while the cotton is retained. The said endless belt or apron 14 carries the cotton slowly forward away from the condenser, and during such movement the cotton is subjected to jets of air under pressure from nozzles 17, leading through the walls of a casing 18 which incloses the cotton above the belt or apron 14. I have shown these nozzles as directed inward through the upright walls of the casing at the sides of the belt or apron and transversely of the same, but do no restrict myself to that precise disposition of them. The cotton is thus loosened or diffused, and cleansed, in the apron-cleanser, while it is moving slowly, and then goes off over the end of the conveyer belt to be led away for any subsequent operations which are desired, as by means of the tube 19. Such subsequent operations may be lapping, or otherwise.

For supplying air under pressure to provide the jets described, I have shown in the drawings a main pipe 20 which extends along above the trunk 3 and has at proper intervals branches 21 leading downward to the nozzles 11 and 12. Other branches 22 extend to the nozzles 5 and 6 of the gooseneck 2, and still other branches 23 supply the nozzles 17 of the apron-cleanser. Said nozzles may be of any suitable detail construction, but I have shown each branch of the air-pipe terminating in a T-connection 24, one arm of the cross-piece of which screws into the wall through which the nozzle is to be directed and the other arm of said cross-piece receives a closing cap 25. The nozzle-proper is simply a small plug 26 which screws inside the outlet arm of said T-connection, and has through itself a small bore or hole, preferable about five-thirty-seconds of an inch in diameter. Said plug can thus be readily removed for cleaning or the like by taking off the cap 25.

It will be noted that I have shown cotton being diffused and cleaned by jets of compressed air both while moving slowly by mechanical means and while moving more rapidly by suction or pneumatic means, and it will be obvious that cotton could be also acted upon by jets of air under pressure while it was stationary except as to the movements given it by the jets of air themselves. All these are within the scope of my invention, either used singly or in any combination. Furthermore, while I have used the word "air" throughout this description, I intend to signify thereby any gas or fluid which can be utilized for the purpose, without restricting myself exclusively to atmospheric air. "Cotton", also, is used in similar broad sense, and I intend and desire to cover the cleansing of any material having similar qualities or characteristics and to which my improved process could be similarly adapted.

Having thus described the invention, what I claim is,—

1. The combination with a chamber or casing adapted to confine cotton for transportation in a general direction, and means for passing cotton through said chamber or casing, of means for introducing a jet of air under pressure into said chamber or casing against the cotton transversely of its direction of motion through the chamber or casing.

2. The combination with a chamber or casing adapted to confine cotton for transportation in a general direction, and means for passing cotton through said chamber or casing, of means for introducing a jet of air under pressure into said chamber or casing at different points around the same and transversely of the direction of movement of the cotton.

3. The combination with a chamber or casing adapted to confine cotton for transportation in a general direction, and means for passing cotton through said chamber or casing, of means for introducing jets of air under pressure into said chamber or casing against the cotton transversely of its direction of motion through the chamber or casing.

4. The combination with a chamber or casing having inlet and outlet means for cotton, and means for passing cotton through said chamber or casing, of nozzles opening through the walls of the chamber or casing intermediate of its inlet and outlet means and at an angle to the direction of movement of the cotton, and means for supplying compressed air to said nozzles.

5. The combination with a chamber or casing having inlet and outlet means for cotton, of means for introducing a jet of air under pressure transversely of said chamber or casing, and projections upon the interior surface of said chamber or casing for said jet to impinge upon.

6. The combination with a chamber or casing having inlet and outlet means for cotton, of means for introducing a jet of air under pressure transversely of said chamber or casing, and projections upon the interior surface of said chamber or casing for said jet to impinge upon, said projections being inclined in the direction of movement of the cotton.

7. The combination with a trunk having a lateral bend or offset in itself, and means for passing cotton through said trunk, of means for introducing a jet of compressed air through the outer side of said bend transversely of the passage thereof.

8. The combination with a trunk having a lateral U-shaped bend through which cotton is adapted to travel, of means for introducing jets of compressed air one into each arm of said bend at an angle thereto.

9. The combination with a trunk having a lateral U-shaped bend through which cotton is adapted to travel, of means for introducing jets of compressed air into each arm of said bend, said jets being both directed in the direction of onward or forward movement of the cotton.

10. The combination with a trunk through which cotton may pass, said trunk having a depressed receptacle for dirt and other foreign matter, of a grid forming the floor of said trunk over said receptacle and being composed of spaced bars extending obliquely across the floor of the trunk, said grid having at intervals of its length a bar raised above the adjacent bars on both sides of said raised bar.

11. In a trunk for cleaning cotton, the combination of a grid for separating dirt and other foreign matter from the cotton, means for passing cotton through said trunk, means adjacent to said grid at its rear end for introducing a jet of air under pressure into said trunk, and projections upon the inner wall of the trunk adjacent to said grid for the jet of air to impinge upon, whereby the cotton is opened up for the grid.

12. The combination with a chambered casing, and means for passing cotton through said chamber or casing by suction, of means for introducing a jet of air under pressure into said chamber or casing transversely of the direction of movement of the cotton.

13. The combination with a chamber or casing, and means for passing cotton through said chamber or casing by suction, of means for introducing jets of air under pressure into said chamber or casing at different points around the same and transversely of the direction of movement of the cotton.

14. The combination of a chamber or casing, means for passing cotton through said chamber or casing by suction, means for introducing a jet of air under pressure into said chamber or casing transversely of the direction of movement of the cotton, a condenser, a second chamber or casing, a conveyer for carrying cotton from said condenser through said second chamber or casing, and means for introducing a jet of air under pressure into said second chamber or casing transversely of the direction of movement of said conveyer.

15. The combination of a chamber or casing, means for passing cotton through said chamber or casing by suction, means for introducing a jet of air under pressure into said chamber or casing transversely of the direction of movement of the cotton, a condenser, a second chamber or casing, a conveyer for carrying cotton from said condenser through said second chamber or casing, and means for introducing jets of air under pressure into said second chamber or casing in different directions transversely of the conveyer.

16. The combination of a chamber or casing, means for passing cotton through said chamber or casing by suction, means for introducing jets of air under pressure into said chamber or casing at different points around the same and transversely of the direction of movement of the cotton, a condenser, a second chamber or casing, a conveyer for carrying cotton from said condenser through said second chamber or casing, and means for introducing a jet of air under pressure into said second chamber or casing transversely of the direction of movement of said conveyer.

17. The combination of a chamber or casing, means for passing cotton through said chamber or casing by suction, means for introducing jets of air under pressure into said chamber or casing at different points around the same and transversely of the direction of movement of the cotton, a condenser, a second chamber or casing, a conveyer for carrying cotton from said condenser through said second chamber or casing, and means for introducing jets of air under pressure into said second chamber or casing in different directions transversely of said conveyer.

JOHN F. REARDON.

Witnesses:
   CLEOPHAS P. BOWIN,
   ARTHUR A. CHANDLER.